R. J. HUTCHINSON & A. B. GRINDROD.
SPEED AND DISTANCE RECORDER.
APPLICATION FILED OCT. 21, 1908.
964,647.
Patented July 19, 1910.
3 SHEETS—SHEET 1.
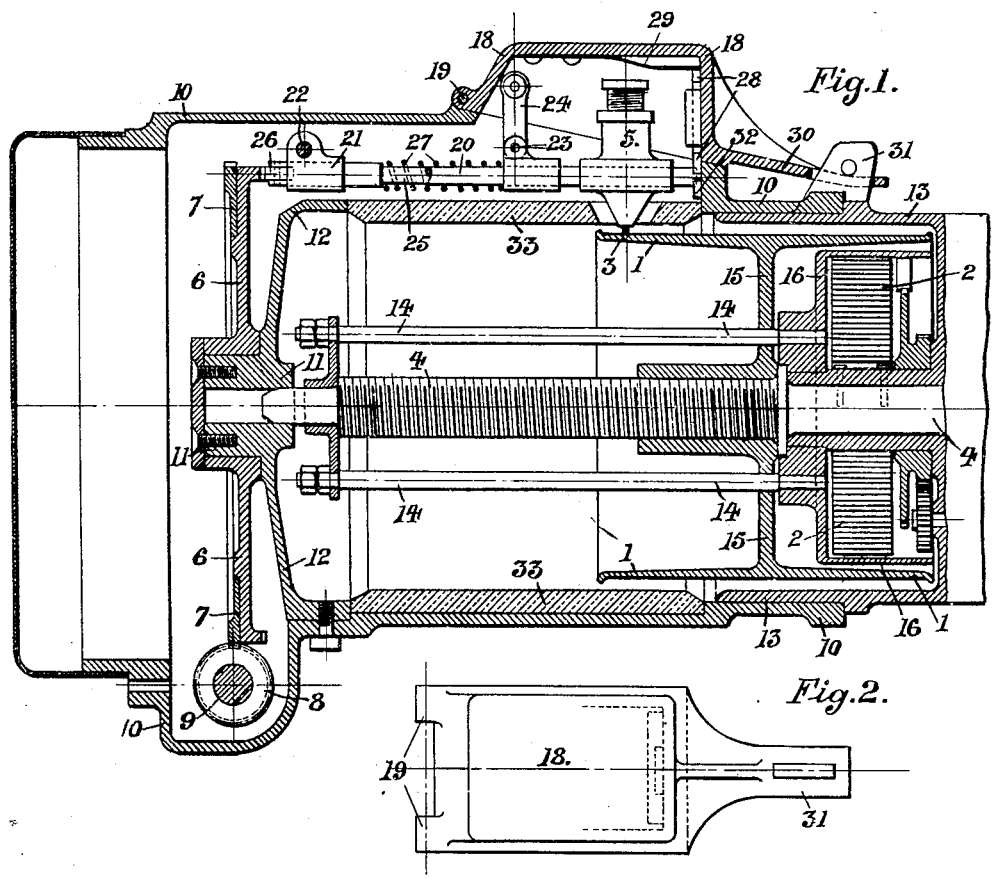
Fig. 1.
Fig. 2.
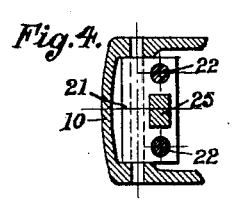
Fig. 4.
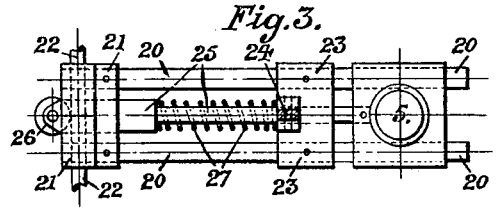
Fig. 3.
Fig. 5.
Witnesses:-
C. H. Crawford
E. Schallinger
Inventors:-
Richard John Hutchinson
Albert Barton Grindrod
by B. Singer
Attorney R. J. HUTCHINSON & A. B. GRINDROD.
SPEED AND DISTANCE RECORDER.
APPLICATION FILED OCT. 21, 1908.

964,647.

Patented July 19, 1910.
3 SHEETS—SHEET 2.

Witnesses:-
C. H. Crawford
E. Schallinger

Inventors:-
Richard John Hutchinson
Albert Barton Grindrod
by B. Singer
Attorney

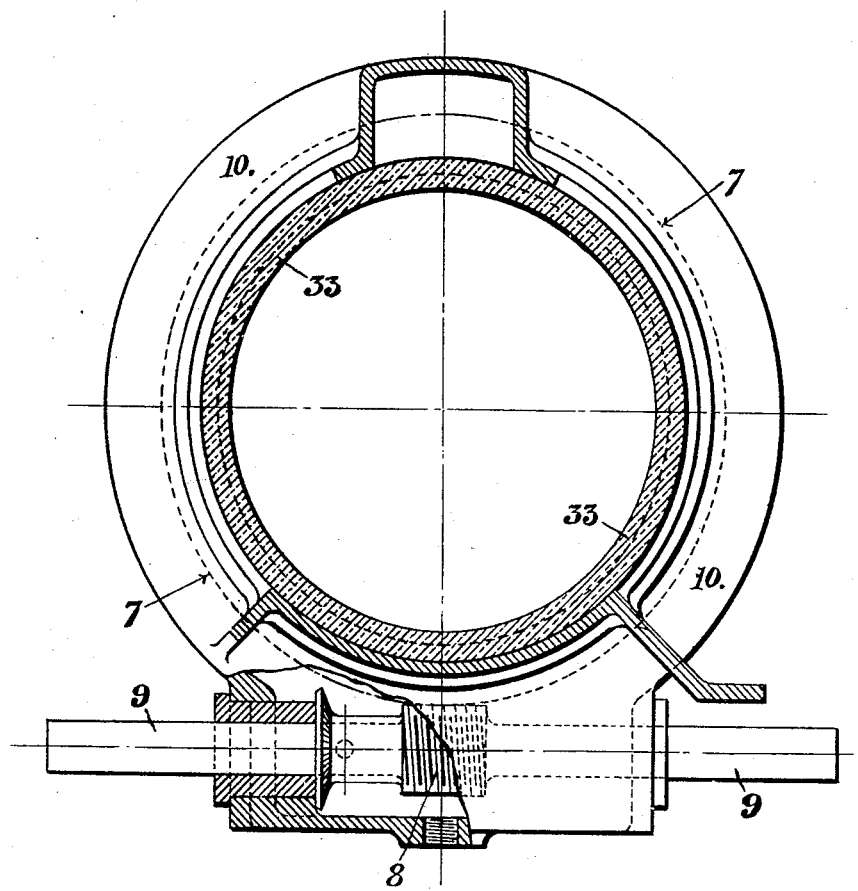

UNITED STATES PATENT OFFICE.

RICHARD JOHN HUTCHINSON, OF BIRKENHEAD, AND ALBERT BARTON GRINDROD, OF ROCK FERRY, ENGLAND.

SPEED AND DISTANCE RECORDER.

964,647.  Specification of Letters Patent.  Patented July 19, 1910.

Application filed October 21, 1908. Serial No. 458,842.

*To all whom it may concern:*

Be it known that we, RICHARD JOHN HUTCHINSON and ALBERT BARTON GRINDROD, subjects of the King of England, residing at Birkenhead, in the county of Chester, England, and Rock Ferry, in the county of Chester, England, respectively, have invented new and useful Improvements in Speed and Distance Recorders, of which the following is a specification.

This invention has reference to speed or distance recorders of the kind in which a clock driven drum is adapted to operate in conjunction with a reciprocated marker for recording the speed over journeys of relatively great length of locomotives, motor cars and other machines; and it has for its objects and effects to provide an improved apparatus of this character which is simple in construction, and by which the recording of the speeds of locomotives, trains, or the like, especially in cases of long journeys, can be effected continuously, yet clearly, while at the same time it is small and compact; and the markings of the diagram are such as to be easily read, and the data afforded present, definitely and graphically, the performances of the locomotive or vehicle, both as to speed and distance, and the character and history of the journey generally and in detail.

The invention will be described with reference to the accompanying drawings, which illustrate a recording apparatus involving the improvements hereunder; the apparatus being specially designed for use in connection with recording the rate of speed, and other data and distances run by locomotives.

Figure 6:
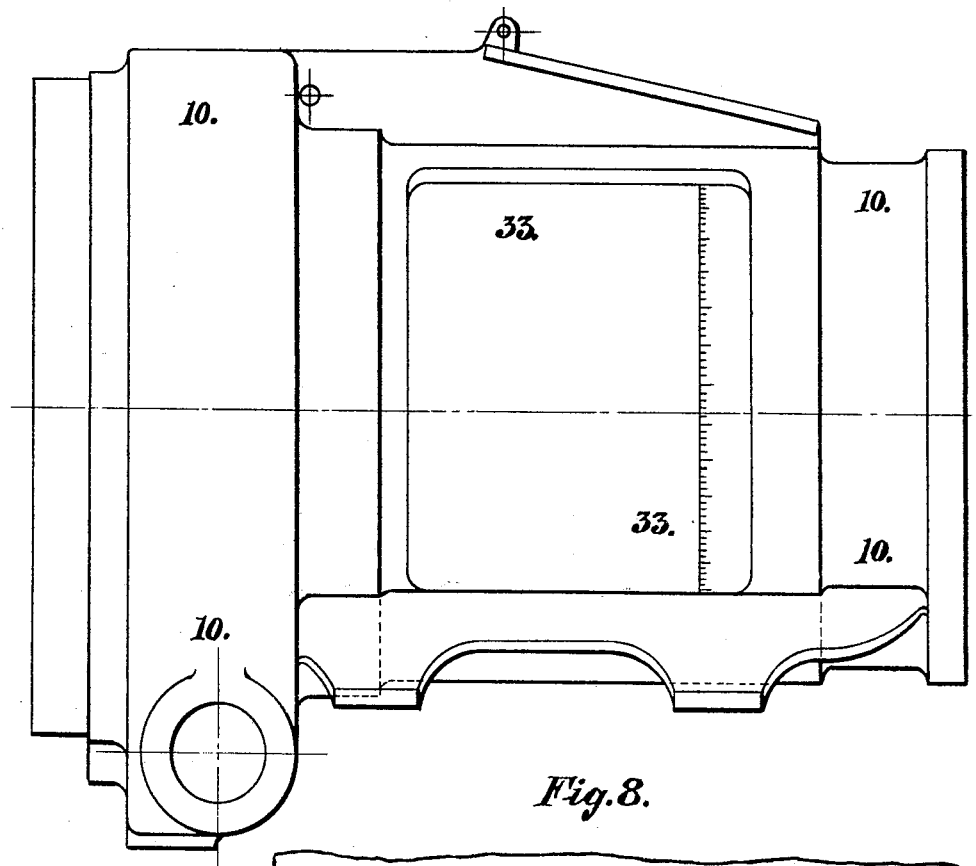
Figure 8:
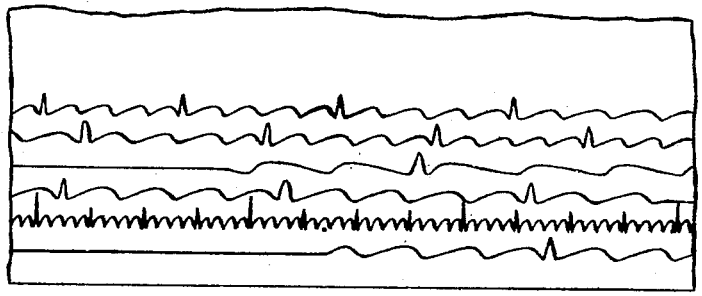

In these drawings, Figure 1 is a sectional elevation of the recording apparatus; Fig. 2 is a plan of a part of same; and Figs. 3 and 4 are plan, and end view, showing a detail. Fig. 5 is a diagrammatic detail showing the profile of a cam used in the apparatus. Fig. 6 is an outside elevation; and Fig. 7 is a cross section of part of the apparatus. Fig. 8 shows a piece of an imaginary diagram.

This invention relates to speed or distance recorders for use on locomotives, motor cars, and other machines; and a recorder involving the improvements hereunder, is hereinafter set forth.

In the recorder, 1 is a drum or the like, driven by a clock or time keeping motor, 2, at a constant speed; and on this drum, a piece of paper or other suitable material is fixed, on which the record to be taken is marked by a pencil or marker device, of which 3 is the writing point.

The drum 1 is made to rotate about a central trunnion or axis 4, which is provided externally with a thread, whereby, as the drum rotates, it is given a longitudinal movement; and the pencil or marker 3 in contact with the paper or other material upon it, draws a circumferential continuous line in screw fashion.

The marker carrier 5 has imparted to it a vibratory motion in a direction parallel with the drum axis, that is, at right angles to its direction of rotation; and this motion is obtained from a moving part of or upon the locomotive, car, or the like; and, consequently, its rate of vibration within a given unit of time, will depend upon, and correspond with, the rate of speed at which the locomotive or vehicle is moving; and as this rate of speed varies, so will the rate of vibration, and number of markings of the pencil or marker vary; while the rate of speed of the diagram sheet of paper on the drum or the like, past the pencil or marker 3, will be constant.

The markings on the diagram chart will represent the number of miles or fractions of miles, per unit of time which the locomotive or vehicle has run; and the apparatus, therefore, indicates and records graphically during the motion of the locomotive or vehicle, by the number of vibrations or markings made by the pencil or marker in a unit of time, the rate of speed at which it has traveled at each and every unit of distance, the number of units of distance within any period of time of the journey, *i. e.*, any sectional totals, as well as the total distance and time.

The vibrations of the carrier 5, in the cases shown are effected by a cam wheel 6, driven by the locomotive or machine, the speed of which it is desired to record; this wheel being mounted on a boss 11 on the internal end-cap 12 of the main casing or cylinder 10; and it is driven by the worm wheel 7 fastened concentrically on it, and a worm 8 mounted on the spindle 9 driven from a moving part of the locomotive or vehicle, or by other suitable device. This cam or cam wheel 6 may have, and in the case shown has, a plurality of projecting parts, which are shown in the laid out profile diagram shown in Fig. 5, so that the marker will be actuated a number of times in a revolution of this wheel. And these parts are so constructed or formed between the points of definite demarkation, that the pencil, while the cam is in motion is never at rest, so that a record is actually being taken of the motion, not only at the points of demarkation, but between same, graphically.

The cam portions may be made with a bias or uneven, as shown by the dotted lines in Fig. 5, so that said bias will be reproduced in the diagram in one direction or the other, according to the direction of rotation of the cam. By this, the direction of motion of the engine or vehicle is recorded. These cam portions or projecting parts however may, if desired, be equal inclines at each side of an apex, as indicated in full lines in the drawing in Fig. 5.

The line produced by the marker on the paper or material will, it will be seen, be continuous. While the locomotive or vehicle is in motion, this line will be zigzag, corresponding with the vibratory motion of the marker, the number of vibratory markings depending on the number of the cam projections, and the speed at which the cam is being driven at any instant of time; and the distance between each pair of strokes marked by the pencil represents the speed during a unit of time. When, upon the diagram, the marking consists of a continuous straight line, it shows that the engine or vehicle is stopped, and the length of time at a station, or other point is recorded by the length of line so drawn. A portion of a diagram is illustrated in Fig. 8. A scale of the markings will be determined upon, which can be read off by the employment of a hand "scale" divided to suit, and corresponding with, or based upon the rate at which the drum will be revolved. To facilitate the readings of the paper on the drum, the paper may be marked with axial lines spaced at suitable intervals apart.

In the case in which the slower speeds to be observed and recorded are the more important, the slower the speed is, the longer become the distances between the markings on the diagram, and the more accurately can such rates of speed be read; and the arrangement above described suits this case. In other cases, however, the apparatus may be required for the more accurate reading the record of higher speeds, and in such cases, the converse arrangement to that above described will be employed; namely, the drum will be driven by the machine whose speed it is required to record, and the cam or cams, and so the marker, will be driven by the clock. In this case, the higher speeds are shown by the longer intervals between the markings, and the slower speeds by the shorter intervals.

In some cases, one of the projections or parts of the cam may be made slightly larger than the rest so that a larger marking or "tick" will be produced to show the mile readings; and the instrument may be further provided with a slow speed cam wheel, if desired, so as to mark off every five miles, or other suitable multiple, this being effected by any suitable gearing and means connected with the main gearing, and a peg or projection thereon which is fixed to the second cam wheel, and which actuates the operative part of the pencil or marker once every five revolutions of the main cam wheel—assuming the cam makes one revolution per mile.

The clock which operates the drum is adapted to be readily removed from the casing 10 of the instrument in which it is disposed, by mounting it within a cylindrical carrier 13, forming an end cover to the apparatus, and fitting within the end of the casing 10, in which it will be suitably locked or fastened. By removal of this carrier 13, the clock and drum 1 will be withdrawn, the completed records or diagrams removed, and a new diagram sheet can be wrapped around and fixed on the drum. The clock 2 and drum 1 are so arranged that when the drum is being wound back, in setting it for a new record, the clock spring is wound up through the driving means, which in the case shown, consists of bars 14 passing through holes in the drum diaphragm 15, the bars being fixed to a revolving part 16 of the clock.

In its finishing position, the drum may either disengage from its driver, so that it will come to rest, while the clock still continues; or, the drum may be brought to rest by a stop, and not disengage from the driver, in which case, the clock will be made to stop with the drum. This latter arrangement will insure the clock being wound up every time a new diagram is required to be taken.

The general casing 10 of the apparatus— the general axis of which is horizontal—is fitted with a movable lid 18, above the marker or pencil device 5, by which access can be obtained to the marker and parts within, the lid being hinged at 19 to the casing. The part 5 carrying the pencil or marker is so hinged or carried that when the lid 18 is opened, the pencil or marker is raised from the drum 1. When the lid 18 is closed, its end 30 engages the lug 31 in the clock casing 13, so that both lid and clock are secured in position together, and may be locked; and it is so arranged that the clock with its drum cannot be removed or replaced unless the cover 18 is open, and consequently the pencil or marker is raised.

With regard to the hinging of the marker carrier 5, it is mounted and adapted to slide to and fro in side bars 20, the ends of which next the cam wheel 6, are fastened in a bracket 21, which is supported on a cross pin 22 forming the hinge; while near the marker carrier 5, the bars 20 are secured in a block 23, which is connected to the cover 18 by a link 24. Hence when the cover is opened and moved about its hinge 19, the marker will be moved up away from the drum 1, and when closed, it will be moved toward or onto the drum.

The cam 6 actuates the marker carrier 5 through a rod 25, which may have a roller 26 at the one end, which the cam works upon, and which is pressed up to the cam by a spring 27.

The end of the rods 20 rest in seats 32 and they are held down in them by the bolt 28 carried in the cover 18, and pressed down normally therein by a spring 29.

The cover 18 may be provided with a window; and the speed for each mile, or portion of a mile, may be read through the window 33, which is a glass cylinder, it being provided with a suitable scale, placed in such a position, that the record as it is being made, will pass close to said scale, and therefore can be easily read.

The only opening to the interior of the chamber in which the drum revolves, is where the marker or pencil 3 passes through the glass cylinder 33, and hence this chamber is practically dust and grease proof.

By this apparatus, a practical and mechanically definite record can be made upon a comparatively small piece of paper, say 12" x 3½" for a run of, say, 12 hours or more; and this record will show:—(1) speed at any point in a journey from zero to infinity; (2) distance run; (3) duration of stops; (4) time at any point (the time at one point being given); and (5) reversal of motion and direction of travel, with the characteristics under Nos. 1, 2, 3 and 4. Further, the marker in this apparatus never being at rest while the cam is in motion, every portion of the journey, however small, is recorded. Also, the drum cannot be removed or replaced unless the marker is raised; and the whole apparatus cannot be tampered with when the boss or part 31 is padlocked, for this secures both the lid or cover 18, and the clock.

What is claimed is—

1. In a speed recording mechanism, the combination of a longitudinally movable clock driven drum, a toothed wheel mounted concentrically with the drum, a marker device actuated by the toothed wheel, a casing which incloses the drum, and wheel, and supports one part of the marker device; a removable lid which supports another part of the marker device and presses it against the drum when it is closed on the casing, and means for connecting the toothed wheel with the driving mechanism.

2. In a speed recording mechanism, the combination of a longitudinally movable clock driven drum, a toothed wheel mounted concentrically to the drum, a casing for inclosing the parts of the mechanism, a removable lid, a spring returned marker device which is actuated by the wheel and held in contact with the drum by the lid when it is closed, and having bearings pivotally mounted to the casing and cap; and means for connecting the toothed wheel with the driving mechanism.

3. In a speed recording mechanism, a casing having a removable end portion, a lid connected to the casing which engages with the removable end portion when closed, a longitudinally movable clock driven drum, a toothed wheel mounted concentrically thereto, means for connecting the wheel with the driving mechanism, and a marker device having a support extending on each side which engages with bearings pivotally connected to the casing and lid when the latter is closed against the casing.

4. In a speed recording mechanism, a longitudinally movable clock driven drum, a toothed wheel mounted concentrically to the drum, means connecting the wheel with the driving mechanism, a marker device attached to a rod arranged parallel to the drum which is held in contact with the toothed wheel by a spring, a casing inclosing the parts of the mechanism, and having fixed and pivotally mounted bearings for the ends of the rod of the marker device, and a lid connected to the casing having an intermediate bearing pivotally attached to it for the said rod, and a spring pressed means for holding the end of the rod against the fixed end bearing on the casing, and the marker device against the drum when the lid is closed.

5. In apparatus for recording the rate of speed and distance run by locomotives or vehicles, the combination of a main casing 10; a longitudinally movable drum 1; a stationary clock mechanism 2 connected with said drum for revolving it; a cam wheel 7 having a plurality of rises and falls mounted co-axially with said drum; a marker 5 directly actuated by said cam wheel 7 and carried on longitudinal members parallel with the axis of the drum; a marker carrier device 26 hinged near said cam; and a suspended support or carrier 23 carrying said marker supporting longitudinal members; a hinged lid 18 on the casing 10; and suspension means connecting said lid with said carrier portion 23; substantially as described.

6. In apparatus for recording the rate of speed and distance run by locomotives or vehicles, the combination of a casing 10; a cam 7 at one end adapted to be rotated from the locomotive or vehicle; a clock casing 13 fitting in the open end of the said casing opposite the cam; a clock mechanism 2 fixed in said clock casing; a central threaded spindle 4 carried from said clock mechanism; a diagram drum 3 mounted and adapted to be revolved on said spindle 4 by said clock; and a marker 5 supported by longitudinal members parallel with the axis of said drum and shaft, and adapted to be acted upon by the cam at one end, and connected and supported at the other by supporting means connected with the said lid 18; substantially as described.

In testimony whereof we have signed our names to this specification in the presence of two subscribing witnesses.

RICHARD JOHN HUTCHINSON.
ALBERT BARTON GRINDROD.

Witnesses:
SOMERVILLE GOODALL,
RICHARD JENKINS.